US012524505B2

(12) United States Patent
Nouri

(10) Patent No.: US 12,524,505 B2
(45) Date of Patent: Jan. 13, 2026

(54) CROSS-MODAL DATA COMPLETION AND COMPRESSION

(71) Applicant: Microsoft Technology Licensing, LLC, Redmond, WA (US)

(72) Inventor: Elnaz Nouri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 825 days.

(21) Appl. No.: 17/854,975

(22) Filed: Jun. 30, 2022

(65) Prior Publication Data

US 2024/0004963 A1    Jan. 4, 2024

(51) Int. Cl.
*G06F 18/25*      (2023.01)
*G06F 18/10*      (2023.01)
*G06N 20/20*      (2019.01)

(52) U.S. Cl.
CPC ............ *G06F 18/256* (2023.01); *G06F 18/10* (2023.01); *G06N 20/20* (2019.01)

(58) Field of Classification Search
CPC ....... G06F 18/256; G06F 18/10; G06N 20/20; H03M 7/6064; H03M 7/3059
See application file for complete search history.

(56) References Cited

U.S. PATENT DOCUMENTS

2023/0010160 A1*  1/2023  Chen ................... G06V 10/80

FOREIGN PATENT DOCUMENTS

CN      113807440 A      12/2021
EP       4109347 A2      12/2022

OTHER PUBLICATIONS

Cross Modal Compression: Towards Human-comprehensible Semantic Compression (Year: 2021).*
Li, et al., "Cross modal compression: Towards human-comprehensible semantic compression", In Proceedings of the 29th ACM international conference on multimedia, Oct. 17, 2021, pp. 4230-4238.
Lu, et al., "Learning based Multi-modality Image and Video Compression", In Proceedings of the IEEE/CVF Conference on Computer Vision and Pattern Recognition, Jun. 2022, pp. 6083-6092.
"International Search Report and Written Opinion Issued in PCT Application No. PCT/US23/022884", Mailed Date: Aug. 28, 2023, 15 Pages.

* cited by examiner

*Primary Examiner* — Pei Yong Weng

(57) ABSTRACT

Aspects relate to analyzing multimodal datasets using one or more cross-modal machine learning models. The machine learning models are operable to generate analysis data related to the different data modalities. The analysis data can be used to identify related portions of data in the different modalities. Once these relationships between the different modalities of a data are identified, the relationships can be leveraged to perform various different processes. For example, a first portion of data having a first modality can be used to reconstruct missing or erroneous data from a second modality. The relationship between content stored in the different modalities can further be leveraged to perform compression on multimodal data sets.

20 Claims, 9 Drawing Sheets

CROSS-MODAL DATA COMPLETION AND COMPRESSION

BACKGROUND

Increases in the availability of devices capable of transmitting data using different modalities has led to an increase in the amount of applications that use multimodal data. While applications used to primarily send data using a single modality, e.g., audio data for a phone call, text data for an instant message, it is now common for application to utilizes different data modalities in a single session.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to analyzing multimodal datasets using one or more cross-modal machine learning models. The machine learning models are operable to generate analysis data related to the different data modalities. The analysis data can be used to identify related portions of data in the different modalities. Once these relationships between the different modalities of a data are identified, the relationships can be leveraged to perform various different processes. For example, a first portion of data having a first modality can be used to reconstruct missing or erroneous data from a second modality. The relationship between content stored in the different modalities can further be leveraged to perform compression on multimodal data sets.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 5A:
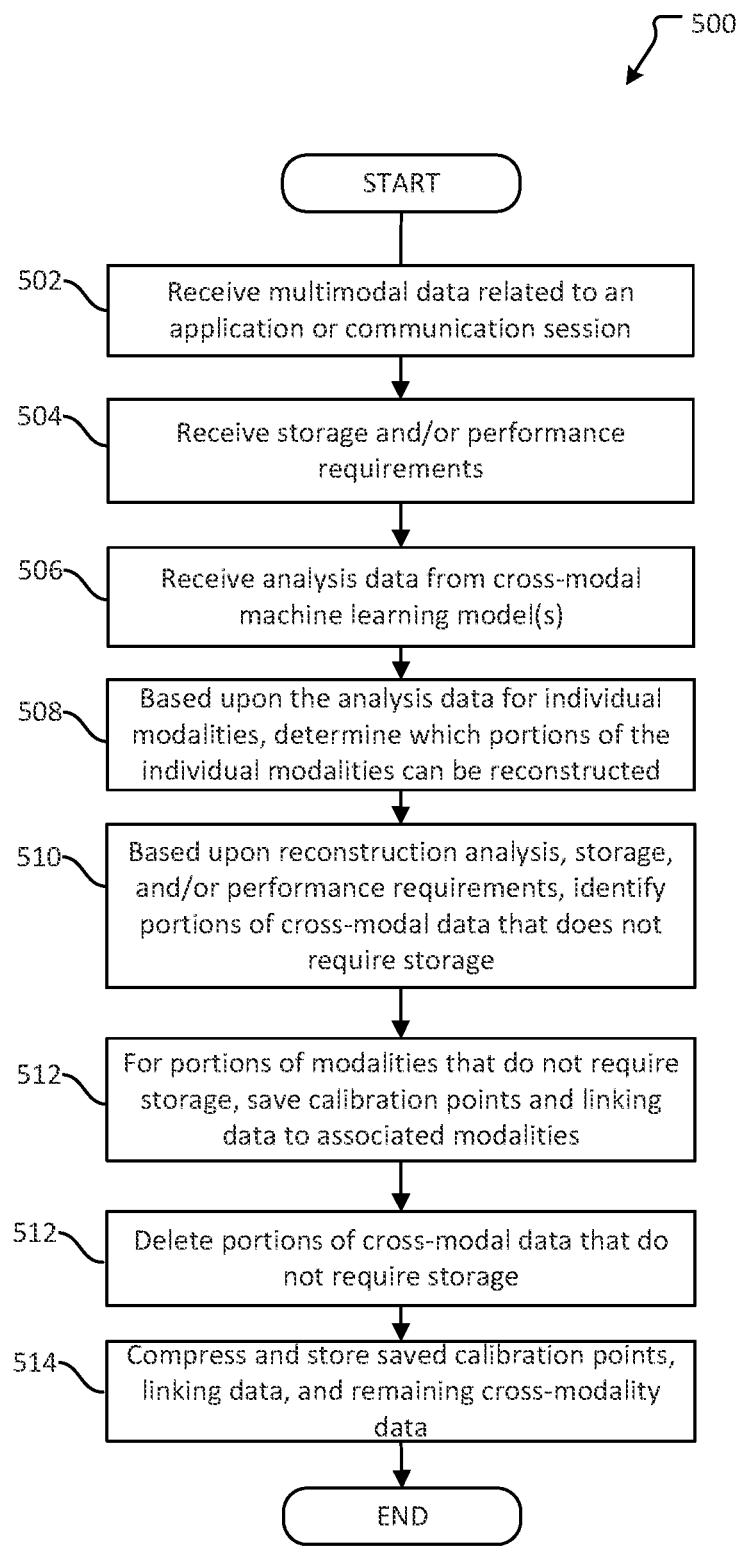
FIG. 5A depicts an exemplary method for utilizing analysis data from one or more cross-modal machine learning models and/or modal specific machine learning models.
Figure 5B:
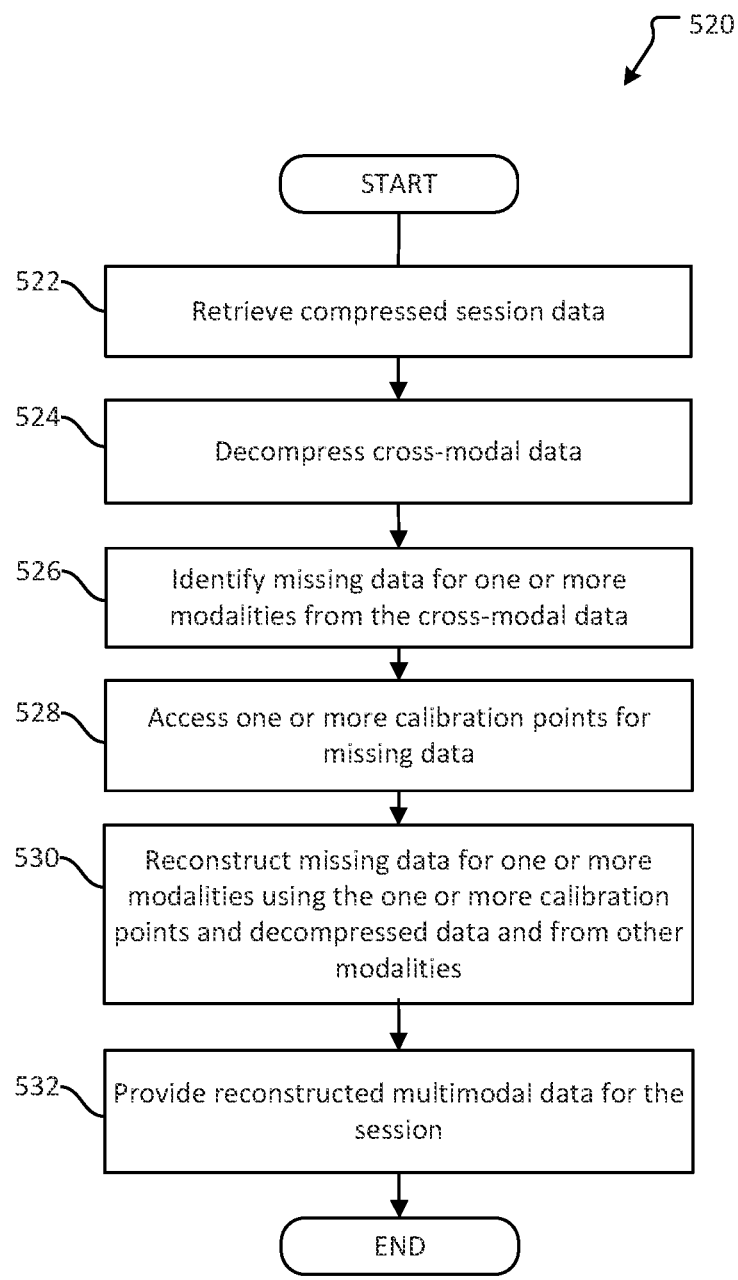

FIG. 5B an exemplary method for decompressing session data.

Figure 6:
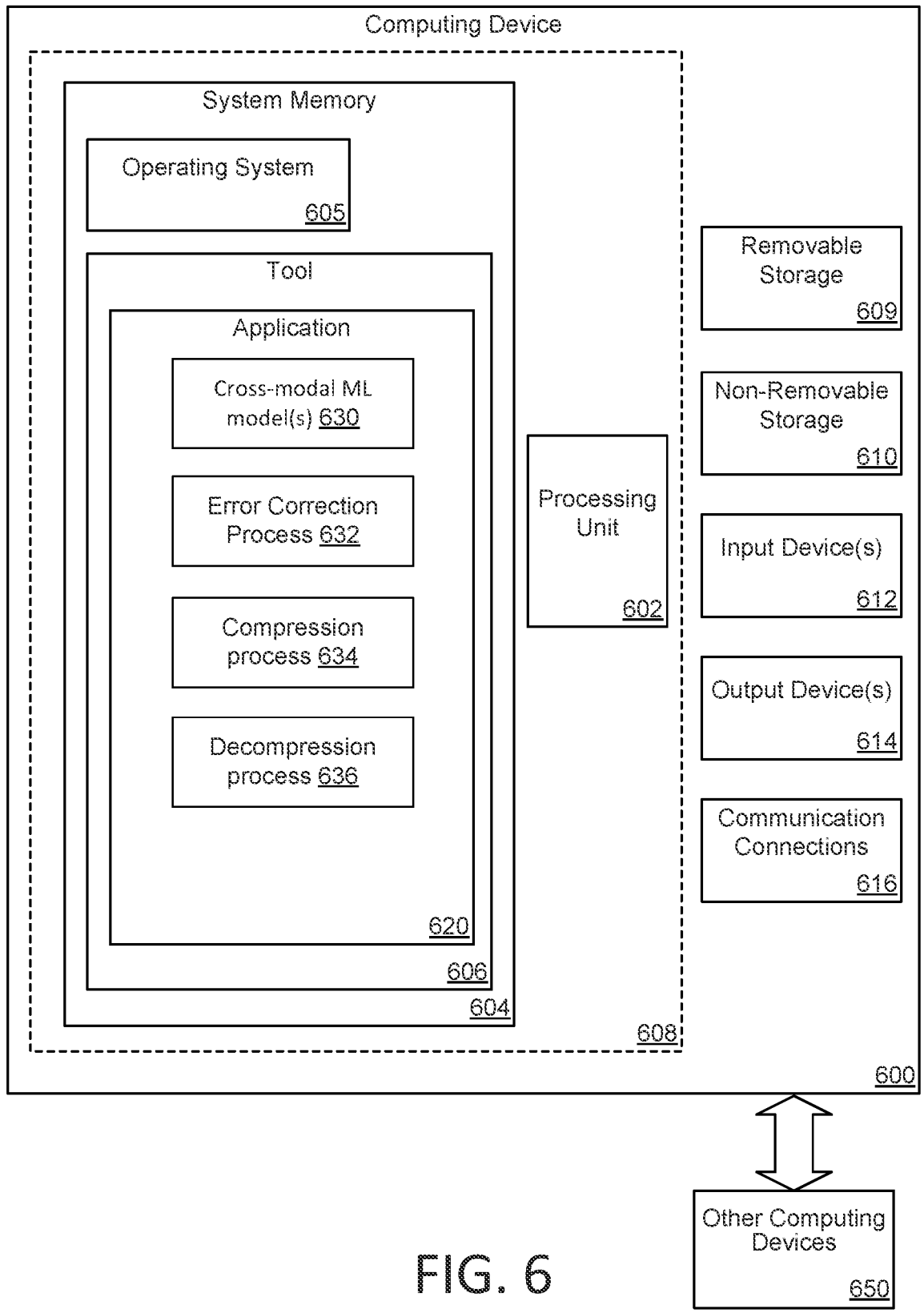

FIG. 6 is a block diagram illustrating example physical components of a computing device with which aspects of the disclosure may be practiced.

Figure 7A:
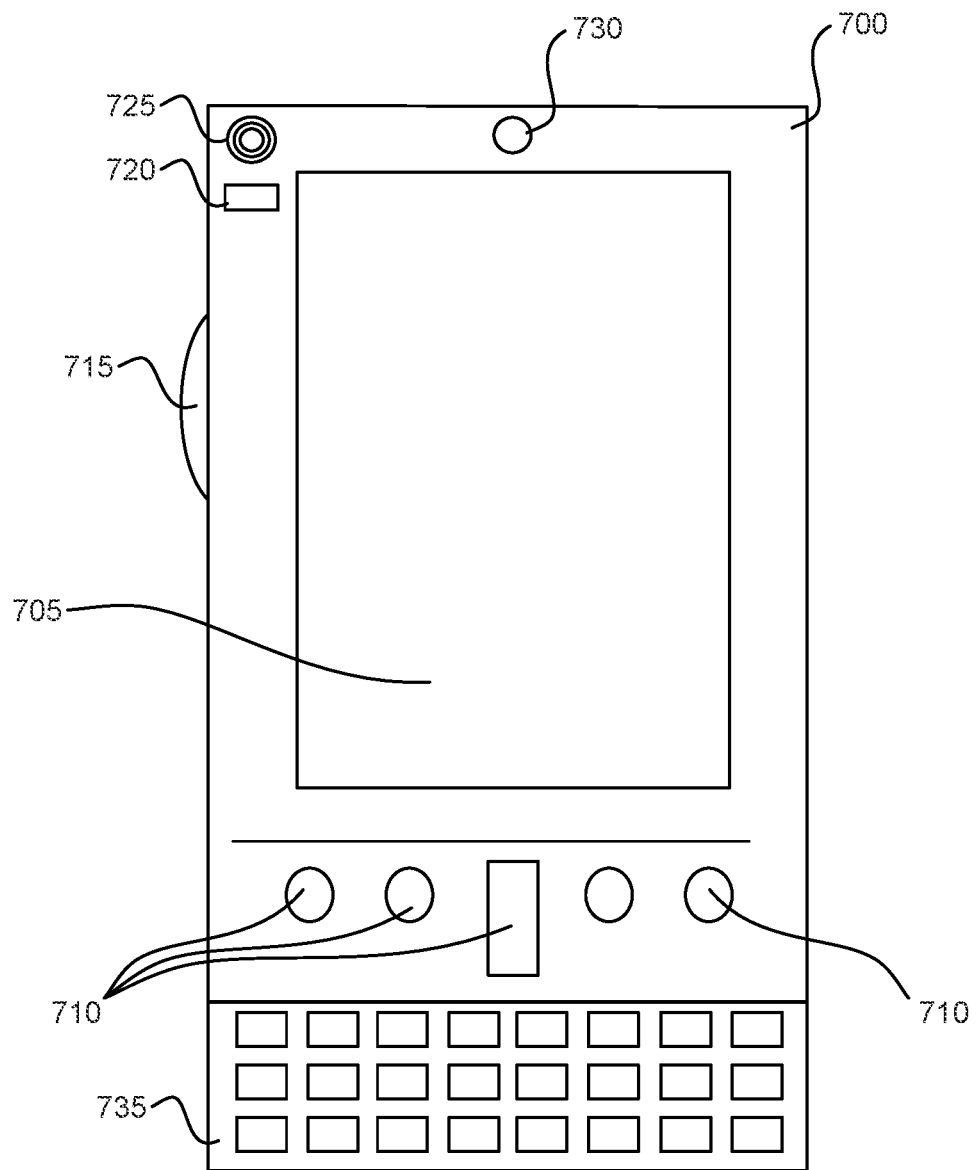

FIG. 7A is a simplified diagram of a mobile computing device with which aspects of the present disclosure may be practiced.

Figure 7B:
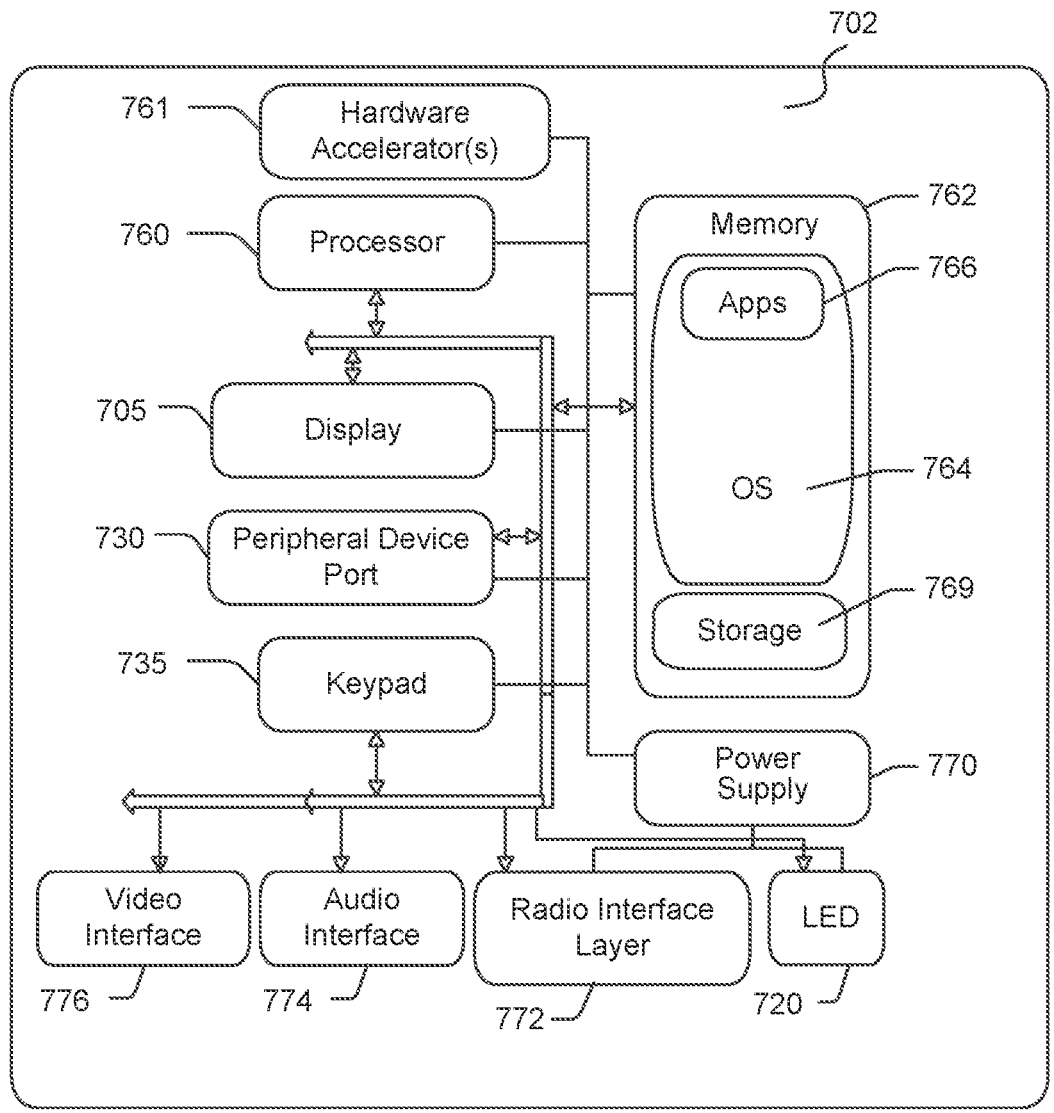

FIG. 7B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Among other benefits, aspects of the present disclosure utilize machine learning models that make is possible to reconstruct data in a first modality using data available in a second, different modality. Aspects disclosed herein are operable to process a multimodal dataset and identify a minimum number of datapoints for which data from the different modalities are available at a time point. For example, consider a multimodal dataset for a movie (audio, visual video, transcription, etc.), a number of data points for which the related video, audio, and text data are identified. These data points act as calibration, or reference, points and the number of calibration points may vary based on the characteristics of multimodal content. In some aspects, the calibration, or reference, points are used to cross-complete the missing data from one modality based on another modality, for example, if audio is missing, we can interpolate and synthesize the audio based on the data at the calibration point and then looking at the video or text modality to generate the audio for missing parts. In yet another aspect of the present disclosure, the data generated by the machine learning models can be used to significantly compress multimodal data. For example, in the case where the multimodal data is data of one person talking, using calibration points for the person, aspects of the disclosure can regenerate other images of the person talking based on the textual data of the interview.

Figure 1:
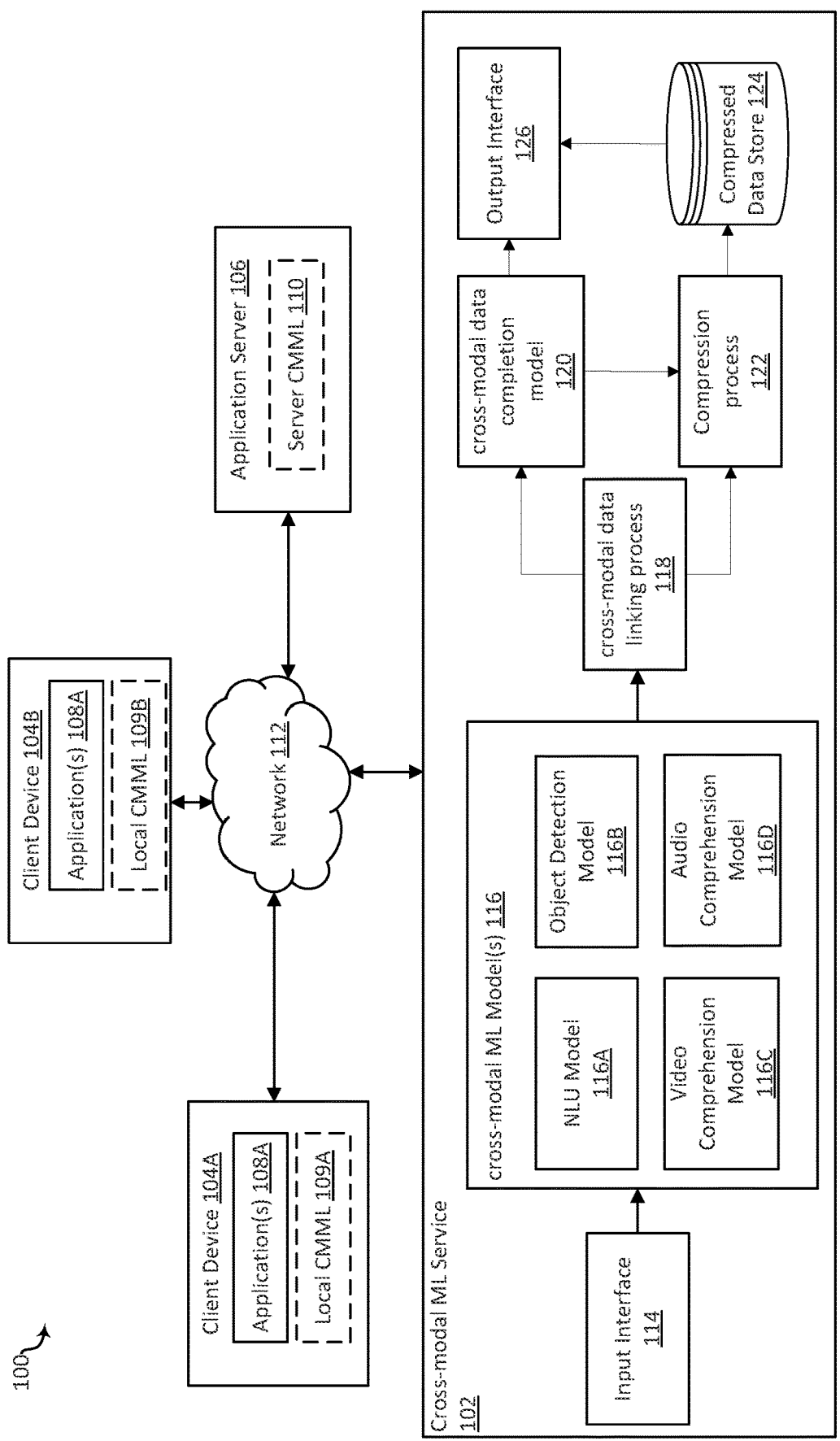
FIG. 1 depicts an exemplary system for performing cross-modal data completion and or compression

FIG. 1 depicts an exemplary system 100 for performing cross-modal data completion and or compression. As shown in system 100, various different client devices (e.g., client device 104A and client device 104B) may interact with an application server 106 and a cross-modal machine learning service 102 via a network 112. Network 112 may be a local area network, a wide area network, a cellular data network, the Internet, or any other type of network. The individual client devices (e.g., client device 104A and client device 104B) may be executing on or more applications (e.g., application(s) 108A executed on client device 104A and application(s) 108B executed on client device 104B) as part of a session. For example, the session may be a communication session in which different data modalities, such as video, audio, and or other types of data (e.g., text, images, etc.) are shared between the client devices 104A and 104B. In such example, the applications 108A and 108B may be a communication application. In another example, the session may be a gaming session in which client device 104A and client device 104B are participating. The different data modalities may be shared between the client devices 104A and 104B during the gaming session, such as, for example, audio data (e.g., player communications), video data, graphics data, gaming data, text data (e.g., in-game chat), etc. are shared between client devices 104A and 104B. In said example, applications 108A and 108B may be gaming applications. One of skill in the art will appreciate that system 100 supports any type of application and/or sessions that share multimodal data. As used herein, multimodal data includes various different data types (e.g., data modalities) that can be shared during a session. For example, different data types may include, but are not limited to, audio data, video data, textual data, control data, gaming data, image data, enterprise data (e.g., documents, presentations, spreadsheets, etc.) or the like. One of skill in the art will appreciate that the system 100 is extensible, such that any type of data modality may be processed by the system 100. For example, application sever 106 may be a communication server, a gaming server, or any other type of server used to facilitate communication or data transfer between client device 104A and client device 104B. Although a specific number of client devices and a single application server are depicted as part of system 100, one of skill in the art will appreciate that any number of client devices or application servers can be employed as part of system 100.

Cross-modal machine learning service 102 is operable to received different data modalities that are transmitted between the client devices 104A, 104B, and/or application server 106 via network 112. In examples, cross-modal machine learning service 102 may require user consent from the various participants in a session prior to receiving data from the communication session in order to maintain user privacy expectations. In one example, cross-modal machine learning service 102 may receive data from client devices 104A and 104B directly. Alternatively, or additionally, cross-modal machine learning service 102 may receive data aggregated for the session shared between the client devices from the application server 106. As shown in FIG. 1, cross-modal machine learning service 102 may include an input interface, one or more cross-modal machine learning models, a cross-modality data linker 118, cross-modal data completion model 120, compression process 122, compressed data store 124 and output interface 126.

Input interface 114 is operable to receive application data associated with a session between client devices. In examples, input interface may establish a communication channel with client device 104A, client device 104B, and/or application server 106 to receive the application data that is transmitted as part of the session. As noted above, the application data includes two or more different data modalities (e.g., data types). In further examples, input interface 114 may also be operable to preprocess the application data to generate a set of feature vectors. The set of feature vectors may be provided as input to the one or more cross-modal machine learning model(s) 116. In one example, a single set of feature vectors may be generated based upon a representation of multi-modal data. That is, using a session between communication applications as an example, a set of feature vectors may be generated based upon the aggregation of the different data modalities included in the application data received by the input interface 114 (e.g., a set of feature vectors may be generated based upon a multi-modal representation of the session which includes video, audio, and textual data). Alternatively, or additionally, preprocessing the application data may include generating different sets of feature data for the different types of data modalities. For example, the application data may be parsed to identify different data modalities. The different data modalities in the application data may be aggregated and the aggregated data for the individual modalities may be processed to generate a set of feature vectors for the individual modalities. In yet another example, one or more machine learning models may be utilized on the application data to isolate different data modalities. The isolated data modalities may be provided as output from the one or more machine learning models and used to create different sets of feature vectors for the isolated data modalities.

The one or more feature sets may be provided to the cross-modal machine learning models 116. FIG. 1 conceptually illustrates the cross-modal machine learning model(s) 116 as different machine learning models specified to analyze different types of data modalities. For example, cross-modal machine learning model(s) 116 includes a natural language understanding (NLU) model 116A, an object detection model 116B, a video comprehension model 116C, and an audio comprehension model 116D. In one example, the cross-modal machine learning model(s) 116 may be a library of different machine learning models trained to process a specific type of data modality (as illustrated in FIG. 1). Alternatively, or additionally, the cross-modal machine learning model(s) 116 may be a single machine learning model that is trained to process multiple data modalities at once. Conceptually, a single cross-modal machine learning model may include different layers used to process different types of data modalities (e.g., NLU layers, object detection layers, video comprehension layers, audio comprehension layers, etc.). NLU model 116A (or NLU layers of a cross-modal machine learning model) may be trained to perform natural language understanding on spoken or text communications. Object detection model 116B may be trained to identify different objects in the application data, such as images, presentations, documents, objects in a video, etc. Video comprehension model 116C may be trained to identify content in video data, such as images or text displayed in the video, perform lip-reading to determine words spoken by a person in a video, identify scene changes, background changes, or reference frames in a video, etc. These portions of the video data may be used as calibration points to reproduce the video content. The video content may be tagged by the video comprehension model 116C based upon content type. Audio comprehension model 116D may be trained to identify audio content, such as spoken language, music, sound effects, etc. The audio content may be identified and tagged by the audio comprehension model based upon content type (e.g., spoken language, music). The audio comprehension model may further be trained to identify calibration points in the audio data that can be used to reproduce the audio data (e.g., voice samples, music selections, etc.). Furthermore, content by the different models, or layers within the same model, may be provided to the other models, or other modal specific layers in a single cross-modal model, which can be used as part of the analysis for the content represented by other modalities. Although specific models and layers are described herein, one of skill in the art will appreciate that cross-modal machine learning service 102 is extensible to perform other type of analysis on other types of data modalities. For example, cross-modal machine learning service 102 may include a lip-reading model or layer(s) that are operable to determine words spoken by a person based upon lip-reading a video feed of the person speaking, an object character recognition model or layer to identify and interpret text displayed in the application data, an action model trained to process actions performed by characters in a game, etc. Accordingly, aspects disclosed herein are extensible to operate on any type of application which utilizes any type of different data modalities.

The cross-modal machine learning model(s) 116 analyze the application data, for example, by processing the one or more sets of feature vectors or processing the raw application data. Analysis of the application data may include identifying content represented by the different data modalities in the application data, tagging content in the application data, transform data modalities (e.g., using speech-to-text to transform spoken communications), determine intent for actions, statements, etc. Additionally, the cross-modal machine learning model(s) 116 may identify one or more calibration points for the different data modalities. As used herein, a calibration point may be a portion of the data modality that can be used to generate content in the same modality. For example, a reference frame of a video may be a calibration point. The reference frame can be used to generate other frames in a video stream. An audio sample of a user's voice, which can be used to replicate the user's voice using a speech generator may be a reference point. One of skill in the art will appreciate that calibration points identified by the cross-modal machine learning model(s) 116 may vary based upon the type of the data modality. Furthermore, the number of calibration points identified by the cross-modal machine learning model(s) 116 may vary depending upon the type of the underlying content represented by a data modality. For example, considering video content, if the video is relatively static (e.g., constant background, no or few scene changes, etc.), the cross-modal machine learning model(s) 116 may identify fewer data points than would be identified for a dynamic video content (e.g., changing backgrounds, frequent scene changes, etc.) as fewer reference frames are required to reconstruct static video content than dynamic video content. As such, part of the analysis performed by the cross-modal machine learning model(s) 116 includes determining changes in the content represented by the different data modalities in order to determine which portions of the data of a specific modality should be tagged as a calibration point and stored in order to reproduce the content represented by the specific modality.

In certain aspects, cross-modal machine learning models may also be stored locally on the client devices or application servers. For example, as depicted in FIG. 1, client device 104A optionally stores and/or executes a local cross-modal machine learning model 108A, client device 104B optionally stores and/or executes local cross-modal machine learning model 108B, and application server 106 optional stores and/or executes server cross-modal machine learning model 110. In certain aspects, the cross-modal data analysis may be performed locally to ensure that a user's private data is maintained on their device. In such circumstances, the results of the analysis may be provided to the cross-modal machine learning service 102 in a manner that omits or obfuscates personal information such that the user cannot be identified in accordance with a user's privacy preferences.

The cross-modal machine learning model(s) 116 (and potentially the local and/or server CMMLs depicted in FIG. 1) analyze the different data modalities to identify content represented in the different modalities and calibration points associated with the content for the individual modalities. In doing so, the cross-modal machine learning model(s) 116 generates a set of analysis data for the different data modalities utilized by the applications. In examples, the analysis data may include, but is not limited to, the underlying content represented by the different data modalities or data related to the underlying content, calibration points for the different modalities, data used to cross-reference related content from the different modalities (e.g., timestamps, content descriptors, content identifiers, etc.). This cross-modal analysis data generated by the cross-modal machine learning model(s) 116 may be used to perform error correction, to generate missing data for one modality based upon the available data for a different modality, and/or to perform compensation on cross-modal application data. In order to facilitate these processes, the cross-modal machine learning model(s) 116 may include a cross-modal data linking process 118. The cross-modal data linking process 118 may be used to link corresponding portions of the different data modalities. That is, the cross-modal data linking process 118 may utilize the cross-modal analysis data generated by the cross-modal machine learning model(s) 116 to determine corresponding portions of different data modalities that relate to the same or similar content. In one example, the corresponding portions may be determined based upon a comparison of the analysis data for the different data modalities. The cross-modal machine learning model(s) 116 may generate representations of the underlying content for different modalities in manners that allow for the comparison of the content for the different data modalities. For example, a transcript of spoken words by a user in a video may be generated by processing the video data (e.g., a first modality) to generate a transcript based upon a lip-reading service. Similarly, a transcript of spoken words may be generated based upon audio data (e.g., a second modality) using a speech-to-text machine learning model or text-to-speech layers of a single cross-modal machine learning model. The generated transcripts may be compared by the cross-modal data linking process 118 to identify portions of the video data that correspond to portions of the audio data by identifying matching portions in the two transcripts.

In another example, the cross-modal data linking process 118 may use metadata to link corresponding portions of the different data modalities. For example, the different data modalities may be associated with timestamps, content identifiers generated by the cross-modal machine learning model(s) 116, content tags generated by the cross-modal machine learning model(s) 116, or other types of metadata. In said examples, the cross-modal data linking process 118 may use metadata in addition to, or instead of, comparing the underlying content for the different data modalities. In said examples, the corresponding portions of the different data modalities may be determined based upon metadata to determine portions of the different data modalities that were generated, sent, or played at the same time.

Upon determining related content for a first modality of data and a second, different modality of data, the cross-modal data linking process 118 generates data linking related sections of the data in the first modality and the data in the second modality. For example, the cross-modal data linking process 118 may generate reference data in the form of a data structure (e.g., a pointer, a reference table, etc.) that links corresponding portions of different modalities of data. The reference data can then be used by an error correction process, a missing data generation process, or compression process as will be described in further detail below. While the cross-modal machine learning service 102 shown in FIG. 1 is depicted as having a separate cross-modal data linking process 118, in alternate examples, the reference or linking data may be generated by the cross-modal machine learning model(s) 116.

The cross-modal analysis data generated by the cross-modal machine learning model(s) 116 and the reference or linking data generated by the cross-modal data linking process 118 may be provided to the cross-modal data completion model 120 and/or the compression process 122. The cross-modal data completion model 120 receives the analysis data, linking data, and/or the original application data. The cross-model data completion model receives the analysis data and/or application data and determines whether one of the data modalities is missing content. As an example, consider a user speaking on a video call. At some point while the user is speaking, the user's mic goes out or is accidentally muted. In said example, the video data (e.g., a first modality) would still show the user speaking, however, the audio data (e.g., a second modality) would be missing content. The cross-modal data completion model 120 may analyze the application data or the analysis data and determine that portions of the audio data is missing. The determination that the audio data is missing may be performed various different ways. In one example, the cross-modal data completion model 120 may determine that content for a specific data modality is missing over a time period. In another example, the cross-modal data completion model 120 may compare corresponding analysis data from a first modality to a second modality to determine that the second modality analysis data for the second modality data is missing, or otherwise differs from the analysis data for the first modality. In an example where the analysis data for the second modality is missing, a determination can be made that the application data for the second modality is missing from the application data. Upon determining that data for the second modality is missing, the cross-modal data completion model 120 may use corresponding data from the first modality and calibration points for the second modality to generate the missing data. For example, the cross-modal data completion model 120 may be trained to generate data in one or more modalities based upon data representing content from a different data type. Continuing with the above example in which the audio data is missing, analysis data generated by the cross-modal machine learning model(s) 116 for the first data modality (e.g., video data) may be provided to the cross-modal data completion model 120 along with calibration points generated by the cross-modal data completion model 120 for the second data modality (e.g., audio data) to generate the missing data in the second modality. For example, the analysis data for the video may include a transcript generated by a lip-reading machine learning model. Based upon linking data generated by the cross-modal data linking process, portions of the transcript that correspond to the missing audio data may be provided to the cross-modal data completion model 120 to generate the missing audio data. Further, the calibration points for the audio data may be used by the cross-modal data completion model 120 to generate spoken text for the portion of the transcript that emulates the user's actual voice. In doing so, the cross-modal data completion model 120 may be leveraged to generate missing or otherwise corrupted data for a second modality (e.g., audio data in the example) based upon analysis data for a second modality that is representative (e.g., simulates the user's voice in the example) of the missing or corrupted data through leveraging calibration points for the second modality of data. The data generated by the cross-modal data completion model 120 may be provided to an output interface 126 which is operable to send the generated data to a requesting device (e.g., client device 104A, client device 104B, and/or application server 106). Additionally, the generated data may be provided to the compression process 122.

The compression process 122 receives analysis data from the cross-modal machine learning model(s) 116, data from the cross-modal data linking process 118, and/or original data from the session to perform compression of the data related to the session. In addition to receiving data from the models, the compression process may receive compression instructions. For example, the compression instructions may be to maximize compression to save storage space, minimize computing requirements to decompress and recreate the multimodal data, set acceptable levels of quality loss based upon compression, or the like. Based upon the instructions, the compression process utilizes the analysis data from the cross-modal machine learning model(s) 116 and data from the cross-modal data linking process 118 to determine which portions of a first data modality can be used to reconstruct portions of a second data modality. Once these related portions are identified, the compression process identifies portions of the original data that can be removed from the original data based upon the compression instructions. For example, if the instructions are to maximize compression, data modalities from the original that require larger amounts of storage space or that are not highly compressible may be omitted from the compressed file. Instead, calibration points for those modalities may be saved along with instructions to reconstruct the data during a decompression process using a different modality that is easily compressible or requires less storage space. For example, rather than including video data for the compressed file, calibration points for the video data generated by the cross-modal machine learning model(s) 116 may be included in the compressed file along with instructions to reconstruct the video data using data from a different modality and/or analysis data for video data or other data modalities. For example, when decompressing and providing the session data, the calibration points may be retrieved from the compressed file and provided to the cross-modal data completion model 120 to reconstruct the original video data. Conversely, if the compression instructions are to reduce processing required to reconstruct the original session data, a larger amount of video data may be saved in the compressed file while data that requires a lesser amount of computational processing (e.g., text data) may be omitted from the compressed file. The compressed file for the session may be stored in the compressed data store 124. The output interface 126 may retrieve the compressed file and provide it to a requesting device. The compressed file may be decompressed and omitted data types (e.g., video data from the example above) may be reconstructed, for example, using the cross-modal data completion model 120 prior to being transmitted to the requesting device via output interface 126. Alternatively, some or all of the compressed file for the session device may be decompressed and reconstructed locally on the requesting device if the requesting client device includes local machine learning models capable of doing so.

Figure 2:
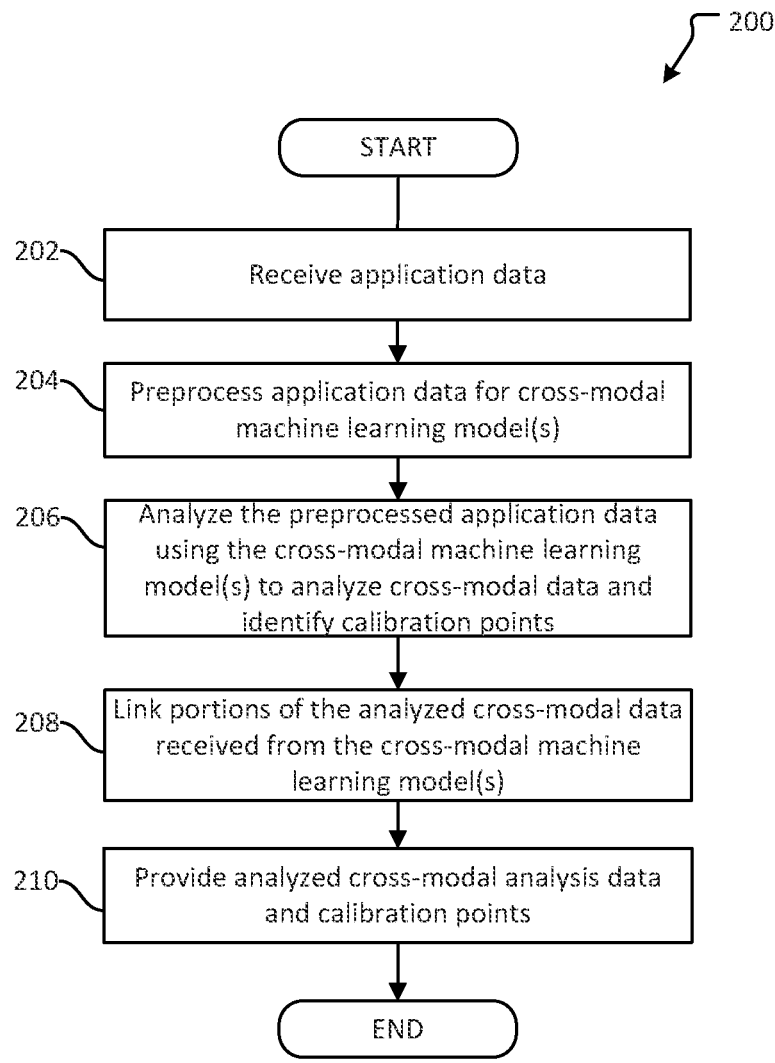
FIG. 2 depicts an exemplary method for analyzing cross-modal data from one or more applications.

FIG. 2 depicts an exemplary method 200 for analyzing cross modal data from one or more applications. In aspects, an application may be any type of application that utilizes cross modal data, such as, for example, a communications application, a video game, a media player, etc. That is, aspects of the present disclosure are capable of utilizing different data types. For example, a communications application may be operable to generate, transmit, or playback audio, video, and textual information, a video game may be operable to transmit graphics data, audio data, video data, textual data, control instructions, etc. One of skill in the art will appreciate that aspects of the present disclosure can be practice with any type of application that generates and/or provides various different types of cross modal data.

Flow begins at operation 202 where the method 200 receives application data. The application data may be received from one or more applications. Further, the data may be generated using a single device or multiple devices, such as client device 104A, client device 104B, or application server 106A of FIG. 1. The application data received at operation 202 includes cross modal data, that is, data having different modalities. For example, the application data may include text, audio, video, graphics, executable instructions, or any other type of data. As noted, aspects of the present disclosure are operable to process any type of data utilized by an application. Flow continues to operation 204 where the received application data is preprocessed in accordance with one or more cross modal machine learning models. At operation 204, the application data may be processed to generate feature vectors which can be provided as input to the one or more cross-modal machine learning models. In one example, the application data may be received as a single stream or file which includes data having different modalities. In said example, a set of feature vectors may be generated based upon the single stream or file. That is, the set of feature vectors may be generated based upon a combined representation of the different data modalities. Alternatively, the preprocess operation may analyze the single file to separately identify the different data modalities contained in the stream or the file. For example, if the application data stream is a communication session that includes video, audio, and text (e.g., an instant message portion), the application data may be analyzed to separately identify the different modalities. For example, the analysis may examine the contents of the stream or file to identify different data types. Alternatively, the data stream or data file may be processed using one or more machine learning model trained to identify and isolate different data modalities stored within. In said instances, where individual data modalities can be isolates, the separate sets of feature vectors may be generated for the different modalities may be generated in addition to, or in the alternative of, a feature set for the single data stream or file.

At operation 206, the one or more feature sets are analyzed using one or more cross modal machine learning models. In one example, a single cross modal machine learning model may be employed to process one or more feature sets. In said example, the cross-modal machine learning model may be trained to identify and interpret different data modalities. That is, the cross-modal machine learning model may be trained to identify different data modalities (e.g., video, text, audio, natural language, etc.) from a set of feature vectors and interpret the different data modalities. The cross-modal machine learning model may also be trained to interpret the different data modalities. As used herein, interpreting the different data modalities may include analyzing a data modality to tag, transform, determine intent, identify content, etc. One of skill in the art will appreciate that the type of interpretation performed by the cross-modal machine learning model may vary based upon the data modality, the type of application, the type of content being analyzed, or other considerations. That is, aspects of the present disclosure are extensible such that any type of analysis or intent processing known to the art can be performed at operation 206.

In examples, the cross-modal data is interpreted to identify the content represented by the different modalities of data. That is, the content may be identified for the different modalities in a way that allows the different modalities to be related. For example, audio data may be processed using the one or more cross-modal machine learning models to perform speech recognition. The recognized speech may be further processed using a natural language layer of the cross-modal machine learning model, or, alternatively using another natural language understanding model, to generate a transcript of the spoken content. The transcript can be compared to other modalities (e.g., a text chat, a transcript generated using a lip-reading machine learning model, etc.) in order to determine related content in the different data modalities.

Operation 206 may also include identifying one or more calibration points for the different data modalities. As used herein, a calibration point is a portion of data that can be used to generate a representation of the data modality in the future. Take, for example, video data. A calibration point may be a reference frame that can be used to generate a portion of the video stream. As another example where audio data is analyzed, a calibration point may be a point in the audio that can be used as a reference point to generate the audio sample in the future (e.g., a sample of a user's voice, a sample of background music, etc.). One of skill in the art will appreciate that the number of different calibration points generated for the different modalities varies based upon the underlying content. Referring to the video example, a static portion (e.g., a static background or a single scene) of video data requires fewer calibration points than a dynamic portion of the video (e.g., multiple scene changes) in order to reproduce the video. As such, part of the analysis performed at operation 206 may include determining how many calibration points are collected based upon the underlying content. The location of the calibration points in the data may be identified at operation 206. One of skill in the art will appreciate that various different processes may be used to identify calibration points based upon the data modality associated with the calibration point.

Upon analyzing the cross-modal data, flow continues to operation 208 where the analyzed cross-modal data is linked. As discussed above, the content represented by the different data modalities is identified as part of operation 206. At operation 208, a link is determined between the different data modalities identifying related portions of content in the different modalities. In one example, the link may be created by comparing the identified content from the different modalities to determine where the content is the same. For example, a transcript generated based upon spoken language in the audio may be compared to a transcript generated using a lip-reading service on the video data to identify similar sections of the transcript. A link may be generated that associates the similar sections of the audio and video data based upon the comparison. Additionally, or alternatively, metadata associated with the different modalities may be used to identify links between the modalities. For example, if the modalities include a timestamp, the different data modalities may be linked by their timestamps. Further detail regarding the linking process is provided in FIG. 3.

Flow continues to operation 210 where the analyzed cross-modal data (e.g., content analysis, content identification, etc. generated by the one or more cross-modal models), the calibration points identified for the different modalities, and linking data is provided. Providing the data, in one aspect, may include storing the data for future use. The data generated at operation 206 may be used to perform compression of the application data received at operation, perform error correction, generate potentially missing data from one or more of the modalities included in the original application data, or the like. As such, the data may be provided to another process, such as a cross-modal data completion process to perform error correction or generate missing data, a compression process, or other application.

Figure 3:
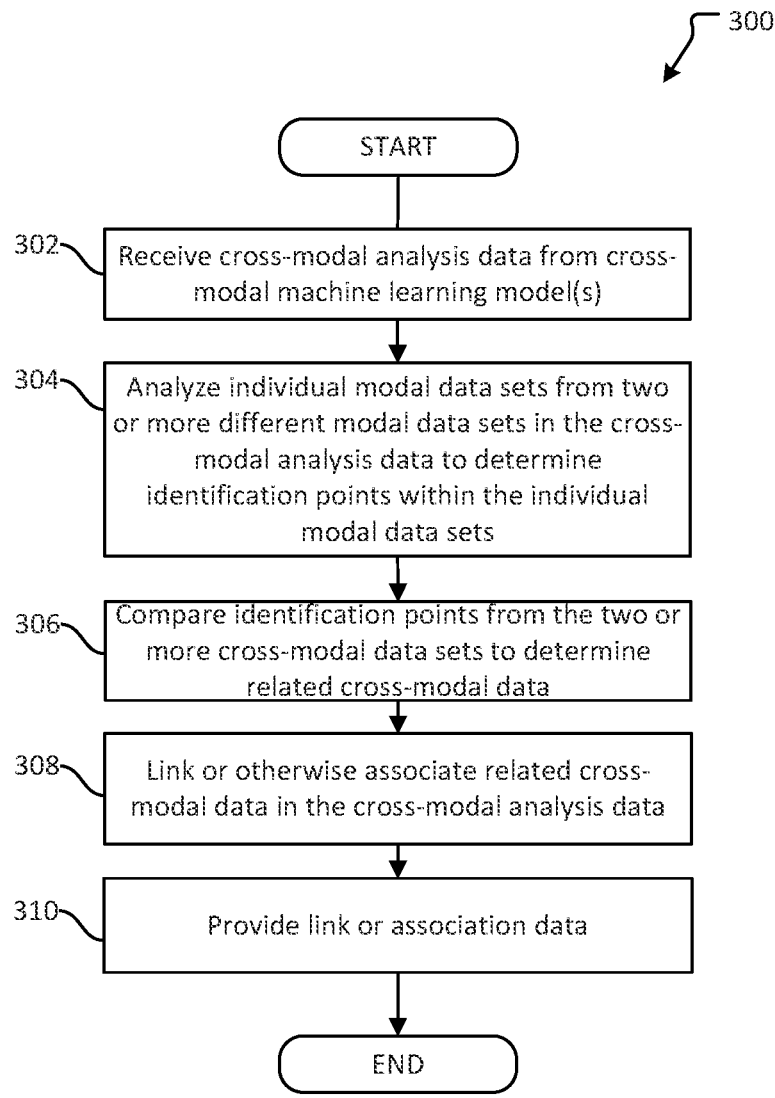
FIG. 3 depicts an exemplary method for linking cross-modal data sets.

FIG. 3 depicts an exemplary method 300 for linking cross-modal data sets. The method 300 utilizes the cross-modal analysis data generated using a cross-modal machine learning model and/or machine learning models trained for specific data types to identify related portions in the cross-modal data set. For example, a cross-modal data set may include various different data types (e.g., video, audio, text, image, graphics, etc.) associated with a session (e.g., an application session, a communication session, a gaming session). The method 300 utilizes analysis data for the different data modalities to determine corresponding portions of data in the different modalities. For example, a corresponding portion of data in the different data modalities may be portions of a first data modality and a second modality that relate to the same content, such as audio data of a user speaking that corresponds to video data of the user speaking. The method 300 generates a link or association data that identifies corresponding data in different data modalities. Flow begins at operation 302, where the cross-modal analysis data is received from a cross-modal machine learning model or various machine learning models trained to analyze specific data modalities. In examples, the analysis data may include, but is not limited to, the underlying content represented by the different data modalities or data related to the underlying content, calibration points for the different modalities, data used to cross-reference related content from the different modalities (e.g., timestamps, content descriptors, content identifiers, etc.). Alternatively, or additionally, the original data for the session and or metadata related to the session or the individual data modalities.

At operation 304, the cross-modal analysis data and/or analysis data generated for the individual data modalities is examined to determine identification points within the data. As used herein, an identification point may be points in the cross-modal data that relate to underlying content. Alternatively, or additionally, an identification point may be other indicators within the data that can be used to reference the data, such as a timestamp, a label, a marker, or any other type of identification data. At operation 304, a set of identification points for the individual data modalities may be generated (e.g., a set of identification points for audio data, a set of identification points for video data, a set of identification points for text data, etc.). These identification points can be used to cross-reference the underlying content from the different data modalities to determine portions of the different data types that represent related content. As discussed above and herein, the portions of the different data types that represent related content can be used to generate content for the different modalities, compress the session content, etc.

At operation 306, the identification points from the different data modalities are compared to determine if the cross-modal data is related. For example, cross-modal data may be related when they relate to the same underlying content. For example, video data of a person talking during a communication session is related to audio data of the person speaking. However, merely having corresponding identification points in the different data modalities does not mean that the content is related. Continuing with the example of video data of a person speaking being related to the audio data of the person speaking, consider an identification point for text data (e.g., representing the chat feature of a communication application) overlaps with the video and/or audio data (e.g., has a matching timestamp). The text data may be related to a separate conversation over the chat interface that occurred while the person was speaking. In this instance, the text data may not be used to reconstruct audio or video data, however, since the audio and video data relate to the same underlying content, those two modalities may be used to reconstruct the other modality. As such, at operation 306, analysis data is compared for the two or more modalities that have similar identification points to determine if the content is related. As noted above, the cross-modal machine learning model(s) disclosed herein generate analysis data that can be used to identify and/or interpret the content stored in the different data types. At operation 306, the analysis data for different data types is compared to determine whether they different data types represent the related content (e.g., audio of a person speaking and the corresponding video of the person talking).

Based upon the comparison performed at operation 306, two or more data modalities are linked at operation 308. That is, when the content represented by two different modalities is related at an identification point, a link is created associating the two data modalities at those points. In one example, the link is a pointer that may be included in one or both of the data modalities pointing to the related section of content in the other data modality. In another example, a reference table may be generated that stores relations between the different data modalities. One of skill in the art will appreciate that any type of data structure or reference type may be generated at operation 308. At operation 310, the links and/or associations between different data modalities is provided. In one example, providing the link and/or association may include updating the analysis data for an individual data modality to include references to related portions of content in other data modalities. In an alternate example, the links and/or associations may be provided as a separate data element that is associated with the analysis data, the original session data, and/or the calibration points.

While the method 300 is described as a process separate from the cross-modal data analysis performed by the cross-modal machine learning model(s), one of skill in the art will appreciate that, in an alternate example, the cross-modal machine learning models(s) may generate the linking data when analyzing the different data modalities.

Figure 4:
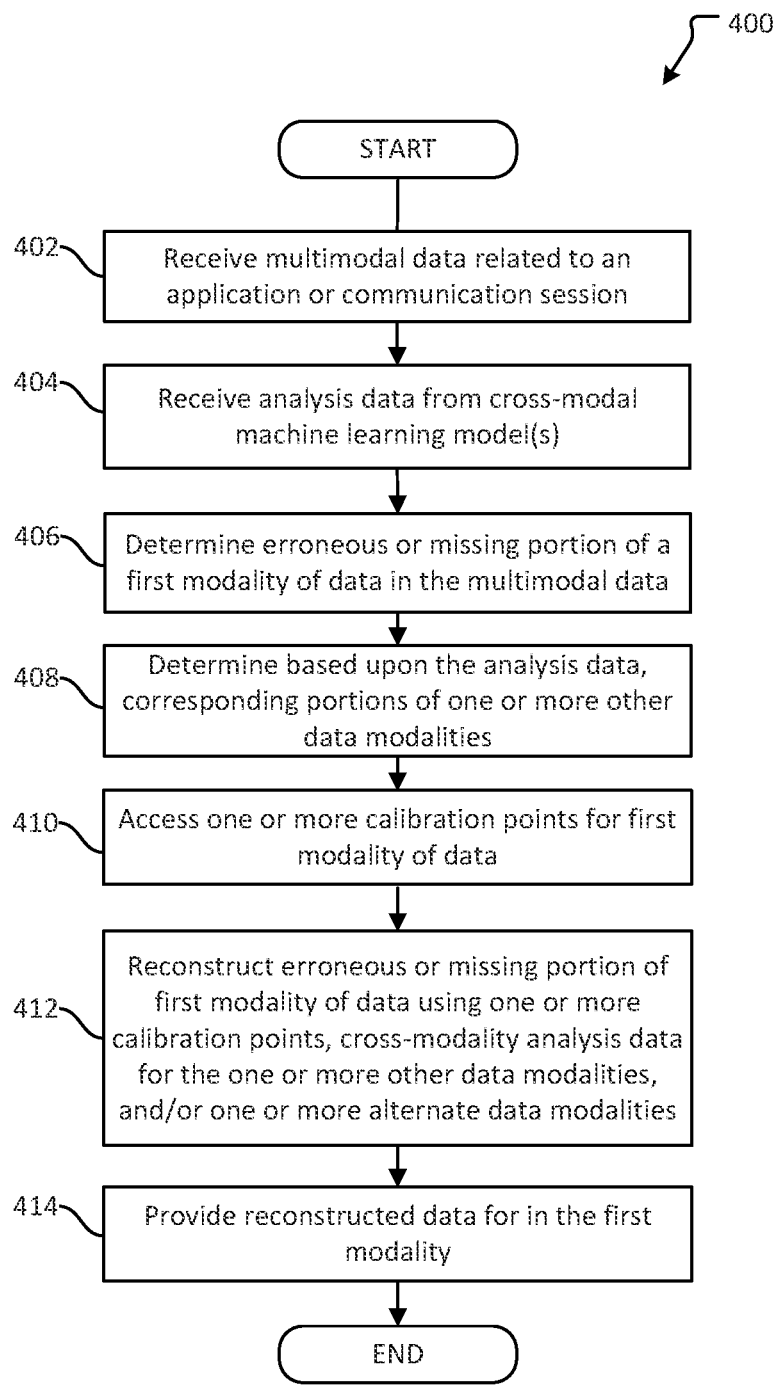
FIG. 4 depicts an exemplary method for reconstructing erroneous or missing content from a first data modality using one or more different data modalities.

FIG. 4 depicts an exemplary method 400 for reconstructing erroneous or missing content from a first data modality using one or more different data modalities (e.g., different data types). In one example, the method 400 may be performed in real-time or near real-time. That is, upon detecting missing or erroneous data for one data modality during a session, the other data modalities may be used to generate the missing data modality during the session. Alternatively, the method 400 may be performed on stored data for a session, for example, to generate missing or corrupted portions of a first data modality based upon data from one or more different data types. Flow begins at operation 402 where multimodal data is received related to an application session or a communication session. As noted above, aspects of the present disclosure can be performed on different types of applications (e.g., communication applications, games, enterprise applications, etc.). That is, the method 400 is operable to process any type of application or session that includes multimodal data. The multimodal data may be received in real-time during the session. Alternatively, the multimodal data from a completed session may be retrieved from a datastore at operation 402.

Flow continues to operation 404 where analysis data is received from one or more cross-modal machine learning models and/or one or more machine learning models trained to analyze a specific data type. As noted herein, among providing other information, the analysis data for the different data modalities provides information about or interpreting the content represented by the different data modalities. Upon receiving the multimodal data and/or the analysis data, flow continues to operation 406 where a determination is made as to whether data in a first modality is erroneous or missing. Various different techniques may be employed to determine whether data in the first modality is missing or erroneous. For example, the data for the first modality can be analyzed to determine if portions of the data are missing (e.g., a portion of a video is dropped or not present in the multimodal data). As another example, the analysis data for the first modality can be compared to analysis data for one or more different modalities to determine if data is missing or erroneous. For example, a speech-to-text representation of the audio data can be compared to a video-to-text representation of video data (e.g., generated using a lip-reading machine learning model or lip-reading layers of a cross-modal machine learning model). If the text representation of the two modalities are equivalent, then it is likely that data from both of the modalities is complete and correct. If, however, the text representations differ at points, there is the possibility that data from one of the modalities is missing or erroneous. In certain aspects, the analysis data may be provided with a confidence score. In such circumstances, the analysis data having the highest confidence score can be deemed correct. As such, points in which analysis data for other modalities differ from the analysis data having the highest confidence score can be identified as missing or erroneous.

Upon identifying one or more missing and/or erroneous portions of data in a first modality (e.g., having a first data type), flow continues to operation 408 where portions of data from different modalities (e.g., different data types) that correspond to the missing or erroneous data in the first modality are identified. The identification performed at operation 408 may be based upon the linking data (e.g., the date generated by the method 300 and/or by cross-modal data linking process 118). Upon identifying corresponding portions from the different data modalities, the corresponding data from those different data modalities may be retrieved at operation 408. At operation 410, one or more calibration points for the first data modality are retrieved. As discussed above, the calibration points are used to generate content in their associated modality. Thus, the amount of calibration points (or if calibration points are even needed) may vary depending upon the data type of the first data modality and/or the underlying content of the first data modality.

At operation 412, corresponding portions of data from the one or more different data modalities retrieved at operation 408 and, potentially, one or more calibration points for the first data modality are used to reconstruct the missing or corrupted data for the first data modality. For example, a machine learning model trained to generate the first modality of data may be employed at operation 412 to generate the missing or erroneous data. The cross-modal data completion model 120 from FIG. 1 is one such exemplary model. The machine learning model may receive corresponding data from the different modalities to generate the same content in first modality. Further, the calibration points can be used to by the machine learning model to generate the content in a manner that simulates the existing content in the first modality. For example, if the first modality is spoken content, the calibration points may be used to generate spoken audio in a voice that is similar to the user who spoke the content. As yet another example, if the missing or erroneous content is video content of a person speaking, calibration points from the video data (e.g., reference frames) may be used to reconstruct the video of the person speaking. Any techniques known to the art for generating simulations may be performed at operation 412 without departing from the scope of this disclosure.

Upon reconstructing the missing or erroneous data for the first modality, the reconstructed data is provided at operation 414. In one example, the reconstructed data may be provided in real-time or near real-time. That is, the reconstructed data may be provided during an ongoing session, thereby correcting errors or missing data as the session proceeds. Alternatively, or additionally, the reconstructed data can be stored with the other session data at operation 414.

FIG. 5A depicts an exemplary method 500 for utilizing analysis data from one or more cross-modal machine learning models and/or modal specific machine learning models. Flow begins at operation 502 where multimodal data is received related to an application session or a communication session. As noted above, aspects of the present disclosure can be performed on different types of applications (e.g., communication applications, games, enterprise applications, etc.). As such, the method 500 is operable to process any type of application or session that includes multimodal data. The multimodal data may be received in real-time during the session. Alternatively, the multimodal data from a completed session may be retrieved from a datastore at operation 502. Flow continues to operation 504, where storage and/or performance requirements for the compression process is received. For example, the compression requirements may be to maximize compression to save storage space, minimize computing requirements to decompress and recreate the multimodal data, set acceptable levels of quality loss based upon compression, or the like. Flow continues to operation 506 where analysis data is received from one or more cross-modal machine learning models and/or one or more machine learning models trained to analyze a specific data type. As noted herein, among providing other information, the analysis data for the different data modalities provides information about or interpreting the content represented by the different data modalities. This data can be used by the compression process to determine which portions of the different data modalities can be recreated using data from other modalities and which cannot.

At operation 508, the analysis data for the different data modalities are compared, for example, using linking data or via the various other types of comparison processes described herein. At operation 508, the method 500 generates, for the different data modalities, a listing of which portions of the data modalities can be reconstructed and which of the other data modalities are used for the reconstruction. This listing is used at operation 510 to determine which portions of the different multimodal data related to the session should be maintained in compression file for the session. In examples, the storage and/or performance requirements are used to determine which portions of the session are to be saved in the compression file. For example, if the requirements received at operation 504 indicates that the session data should be highly compressed, data types for the session which require a large amount of storage or which cannot be highly compressed without an acceptable loss of quality, such as, for example, video data and audio data, may be removed, to the extent possible, from the compressed file for the session. If the requirement is to minimize file size, at operation 510, the data modalities which require more storage space are analyzed to identify which portions of these modalities can be reconstructed using a different modality which requires less storage space or can be highly compressed with an acceptable loss of quality. Because these portions can be reconstructed and doing so would meet with the compression requirements, these portions are identified by the method 500 as not requiring storage.

Upon identifying the portions that do not require storage, flow continues to operation 512 where associated calibration points, linking data to other data modalities, and instructions to reconstruct the identified portions data are gathered and/or generated. Upon gathering this data, flow continues to operation 512 where the portions of data for the different data modalities that can be reconstructed using the remaining data modalities are deleted or otherwise omitted from the compressed file for the session. At operation 514, the remaining session data, calibration points, linking data to other data modalities, and instructions to reconstruct the deleted or otherwise omitted portions are compressed to generate a compressed file for the session. One of skill in the art will appreciate that any compression process can be employed at operation 514. The compressed file can then be stored in a compressed data store for the session and/or sent to one or more requesting devices for local storage on the one or more compressed devices.

FIG. 5B an exemplary method 520 for decompressing session data. Flow begins at operation 522 where the compressed session data (e.g., a compressed file or data stream of the session) is received. At operation 524, the compressed session data is decompressed, for example, using an inverse of the compression process used to compress the session data. Upon decompressing the session data, flow continues to operation 526 where missing data is identified for one or more data modalities (e.g., data types) of the session data. In one example, techniques described to identify missing or corrupted data disclosed herein may be performed at operation 526. Alternatively, or additionally, the instructions to generate the missing data stored in the session file may be used to identify the missing portions at operation 526.

Flow continues to operation 528 where one or more calibration points for the missing data modalities are accessed from the decompressed data store. In examples, calibration points for one or more different data modalities (e.g., for each missing data modality) may be retrieved from the decompressed session data. Flow continues to operation 530 where the missing data for each of the missing modalities is reconstructed using the retrieved calibration points and available data from the other modalities of the multimodal session data. In examples, one or more machine learning models may be employed to reconstruct the missing data for each missing modality. In said example, machine learning models may be trained to reconstruct data for a specific modality may be employed. In said example, a machine learning model for each missing modality may be leveraged at operation 530. Alternatively, a cross-modal machine learning model trained to reconstruct data for various modalities may be employed. In still further examples, a process similar to the method 400 may be employed at operation 530. Upon reconstructing the missing data for one or more modalities, the reconstructed data is provided along with the remaining decompressed session data at operation 532. For example, the decompressed and reconstructed session data may be provided for playback using an application or sent to a requesting device.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 one or more cross-modal machine learning models 630, instructions to perform reconstruction of modal data 632, a compression process 634, and/or a decompression process 636 as described in more detail herein. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., the client device 102 as shown in the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server, a cross-modal machine learning service, a mobile computing device, etc. That is, computing device or the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone. In still further aspects, the system 702 is a PC, a laptop, a server device, or the like.

One or more application programs 766 may be loaded into the memory 762 and run on or in association with the operating system 764, for execution by the processor 760. The system 702 also includes a non-volatile storage area 769 within the memory 762. The non-volatile storage area 769 may be used to store persistent information that should not be lost if the system 702 is powered down. The application programs 766 may use and store information in the non-volatile storage area 769, such as e-mail or other messages used by an e-mail application, and the like. A synchronization application (not shown) also resides on the system 702 and is programmed to interact with a corresponding synchronization application resident on a host computer to keep the information stored in the non-volatile storage area 769 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory encoding computer-executable instructions that, when executed by the at least one processor, cause the at least on processor to perform operations comprising:
receive multimodal data related to a session;
provide the multimodal data to one or more machine learning models, wherein the one or more machine learning models are operable to generate at least a first analysis data for a first modality of the multimodal data and at least a second analysis data for a second modality of the multimodal data;
determine, based upon the first analysis data and the second analysis data, at least a first portion of data having the first modality that can be reconstructed using at least a second portion of data having the second modality;
determine a content change in the first modality of data;
determine one or more calibration points for the first modality of data based at least in part on the determined content change, wherein the calibration points are operable to reconstruct the first portion of data in conjunction with the second portion of data; and
provide the first analysis data, the second analysis data, and the one or more calibration points to reconstruct at least a portion of the first portion of data having the first modality.

2. The system of claim 1, wherein the one more machine learning models comprise a cross-modal machine learning model, and wherein the single cross-modal machine learning model is trained to analyze a plurality of different modalities included the multimodal to generate analysis data for each of the plurality of different modalities.

3. The system of claim 2, wherein the cross-modal machine learning model is trained to process two or more of: video data, audio data, text data, image data, graphics data.

4. The system of claim 1, wherein the one or more machine learning models comprise two or more of:
a first machine learning model trained to analyze video data;
a second machine learning model trained to analyze audio data;
a third machine learning model trained to analyze text data; or
a fourth machine learning model trained to analyze image data.

5. The system of claim 1, further comprising instructions that, when executed by the at least one processor, cause the at least one processor to perform operations further comprising:
link first content having the first modality to second content having the second modality, wherein the first content and the second content are related.

6. The system of claim 5, wherein linking the first content to the second content comprises:
determining a first set of identification points for a first set of data having the first modality;
determining a second set of identification points for a second set of data having the second modality;
comparing, for corresponding identification points in the first set of identification points and second set of identification points, corresponding portions of the first analysis data and the second analysis data; and
based upon the comparison, generating linking data.

7. The system of claim 6, further comprising instructions that, when executed by the at least one processor, cause the at least one processor to perform operations further comprising:
   determine a missing portion of data in the first set of data having the first modality;
   determine, based upon the linking data, a portion of data from the second data set corresponding to the missing portion of data in the first data set; and
   reconstructing the missing portion of data using the portion of data from the second data set corresponding to the missing portion of data in the first data set and the one or more calibration points for the first data modality.

8. The system of claim 7, the missing portion of data is reconstructed using a machine learning model trained to generate data having the first modality.

9. The system of claim 6, further comprising instructions that, when executed by the at least one processor, cause the at least one processor to perform operations further comprising:
   determine an erroneous portion of data in the first set of data having the first modality;
   determine, based upon the linking data, a portion of data from the second data set corresponding to the erroneous portion of data in the first data set; and
   reconstructing the erroneous portion of data using the portion of data from the second data set corresponding to the erroneous portion of data in the first data set and the one or more calibration points for the first data modality.

10. The system of claim 9, wherein the erroneous portion of data is identified by comparing the first analysis data to the second analysis data, wherein the second analysis data has a higher confidence score than the first analysis data.

11. The system of claim 1, further comprising instructions that, when executed by the at least one processor, cause the at least one processor to perform operations further comprising:
   generate instructions to reconstruct the first portion of data using the second portion of data;
   delete the first portion of data;
   generate a file comprising the remaining multimodal data, the instruction to reconstruct the first portion of data, and the one or more calibration points; and
   compressing the file.

12. A computer storage medium comprising computer executable instructions that, when executed by at least one processor, performs a method comprising:
   receive multimodal data;
   provide the multimodal data to one or more machine learning models, wherein the one or more machine learning models are operable to generate at least a first analysis data for a first modality of the multimodal data and at least a second analysis data for a second modality of the multimodal data;
   determine, based upon the first analysis data and the second analysis data, at least a first portion of data having the first modality that can be reconstructed using at least a second portion of data having the second modality;
   determine a content change in the first modality of data;
   determine one or more calibration points for the first modality of data based at least in part on the determined content change, wherein the calibration points are operable to reconstruct the first portion of data in conjunction with the second portion of data;
   determine a missing portion of data in the first set of data having the first modality;
   determine, based upon the linking data, a portion of data from the second data set corresponding to the missing portion of data in the first data set; and
   reconstructing the missing portion of data using the portion of data from the second data set corresponding to the missing portion of data in the first data set and the one or more calibration points for the first data modality.

13. The computer storage medium of claim 12, wherein the one more machine learning models comprise a cross-modal machine learning model, and wherein the single cross-modal machine learning model is trained to analyze a plurality of different modalities included the multimodal to generate analysis data for each of the plurality of different modalities.

14. The computer storage medium of claim 12, wherein the one or more machine learning models comprise two or more of:
   a first machine learning model trained to analyze video data;
   a second machine learning model trained to analyze audio data;
   a third machine learning model trained to analyze text data; or
   a fourth machine learning model trained to analyze image data.

15. The computer storage medium of claim 12, wherein the multimodal data is associated with a communication application.

16. The computer storage medium of claim 15, wherein the method further comprises:
   determining a first set of identification points for a first set of data having the first modality;
   determining a second set of identification points for a second set of data having the second modality;
   comparing, for corresponding identification points in the first set of identification points and second set of identification points, corresponding portions of the first analysis data and the second analysis data; and
   based upon the comparison, generating linking data.

17. A method comprising:
   receive multimodal data related to a session;
   provide the multimodal data to one or more machine learning models, wherein the one or more machine learning models are operable to generate at least a first analysis data for a first modality of the multimodal data and at least a second analysis data for a second modality of the multimodal data;
   determine, based upon the first analysis data and the second analysis data, at least a first portion of data having the first modality that can be reconstructed using at least a second portion of data having the second modality;
   determine a content change in the first modality of data;
   determine one or more calibration points for the first modality of data based at least in part on the determined content change, wherein the calibration points are operable to reconstruct the first portion of data in conjunction with the second portion of data;
   provide the first analysis data, the second analysis data, and the one or more calibration points;
   generate instructions to reconstruct the first portion of data using the second portion of data;
   delete the first portion of data;

generate a file comprising the remaining multimodal data, the instruction to reconstruct the first portion of data, and the one or more calibration points; and compressing the file.

18. The method of claim 17, wherein the one more machine learning models comprise a cross-modal machine learning model, and wherein the single cross-modal machine learning model is trained to analyze a plurality of different modalities included the multimodal to generate analysis data for each of the plurality of different modalities.

19. The method of claim 17, wherein the one or more machine learning models comprise two or more of:
- a first machine learning model trained to analyze video data;
- a second machine learning model trained to analyze audio data;
- a third machine learning model trained to analyze text data; or
- a fourth machine learning model trained to analyze image data.

20. The method of claim 17, wherein the multimodal data is associated with one of a communication session or a gaming session.

\* \* \* \* \*